United States Patent
Durinovic-Johri et al.

(10) Patent No.: US 6,263,065 B1
(45) Date of Patent: Jul. 17, 2001

(54) METHOD AND APPARATUS FOR SIMULATING CENTRAL QUEUE FOR DISTRIBUTING CALL IN DISTRIBUTED ARRANGEMENT OF AUTOMATIC CALL DISTRIBUTORS

(75) Inventors: Sanja Durinovic-Johri, Aberdeen; Yonatan A. Levy, Manalapan; Suhasini V. Sabinas, Marlboro, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/040,223

(22) Filed: Mar. 12, 1998

Related U.S. Application Data (60) Provisional application No. 60/041,077, filed on Mar. 18, 1997.

(51) Int. Cl.$^7$ .................................................. H04M 3/00
(52) U.S. Cl. ......................... 379/266; 379/210; 379/265; 379/309
(58) Field of Search ................................. 379/265, 266, 379/268, 269, 272, 273, 309, 210

(56) References Cited

U.S. PATENT DOCUMENTS

| | | | | |
|---|---|---|---|---|
| 4,737,983 | * | 4/1988 | Frauenthal et al. .................. | 379/221 |
| 4,953,204 | * | 8/1990 | Cuschleg, Jr. et al. ............. | 379/266 |
| 5,153,909 | * | 10/1992 | Beckle et al. ........................ | 379/265 |
| 5,164,983 | * | 11/1992 | Brown et al. ........................ | 379/265 |
| 5,291,552 | * | 3/1994 | Kerrigan et al. ..................... | 379/266 |
| 5,299,259 | * | 3/1994 | Otto ..................................... | 379/221 |
| 5,335,268 | * | 8/1994 | Kelly, Jr. et al. ..................... | 379/112 |
| 5,506,898 | | 4/1996 | Costantini et al. . | |
| 5,530,744 | | 6/1996 | Charalambous et al. . | |
| 5,546,452 | | 8/1996 | Andrews et al. . | |
| 5,590,188 | * | 12/1996 | Crockett ............................... | 379/225 |

FOREIGN PATENT DOCUMENTS 0 647 051    4/1995   (EP) .

\* cited by examiner

*Primary Examiner*—Ahmad Matar
*Assistant Examiner*—Bing Q. Bui (57) ABSTRACT

Calls may be distributed and load balancing maintained for a distributed automatic call distributor (ACD) system by simulating a central FIFO queue at the central routing point of the system. The simulated FIFO queue either requires that the number of calls in queue and the oldest call waiting time of calls at each automatic call distributor be periodically provided to the central routing point or event-based data be provided on each call answered in the system or not routed by the central routing point. Deviations from FIFO order of service recorded at the simulated FIFO queue may signal the need for requiring a call at another automatic call distributor. With additional information on agents available, the call removal rate may be estimated. Also, delay estimates may be updated based on comparing actual and estimated delays over time. The routing point may be updated with traffic data through, for example, a known telemarketing operations performance management system (TOPMS) or directly from the automatic call distributors via the toll telecommunications network.

57 Claims, 6 Drawing Sheets

| SIMULATED FIFO | | | | | |
|---|---|---|---|---|---|
| MAINTAINED IN COSTOMER ROUTING PROCESSOR AS A LINKED LIST... | | | | | |
| LINKED LIST | | | | | |
| POSITION | ENTRY | CALL_ID | TIME_ARR | SITE | ANS_BIT |
| HEAD | 1 | 10 | 30 | 1 | 0 |
|  | 2 | 14 | 43 | 2 | 1 |
|  | 3 | 15 | 44 | 1 | 0 |
|  | 4 | 17 | 46 | 1 | 0 |
|  | 5 | 18 | 50 | 2 | 0 |
|  | 6 | 20 | 51 | 1 | 0 |
|  | 7 | 22 | 55 | 1 | 0 |
| TALL | 8 | 23 | 56 | 2 | 0 |

SIMULATED FIFO ENTRIES AT TIME 60

FIG. 4

| PROCEDURE 1: NEW CALL ARRIVAL | | | | | |
|---|---|---|---|---|---|
| NEW CALL ARRIVES AAT TIME 61 SECCONDS AND IS ROUTED TO SITE 2 | | | | | |
| LINKED LIST | | | | | |
| POSITION | ENTRY | CALL_ID | TIME_ARR | SITE | ANS_BIT |
| HEAD | 1 | 10 | 30 | 1 | 0 |
|  | 2 | 14 | 43 | 2 | 1 |
|  | 3 | 15 | 44 | 1 | 0 |
|  | 4 | 17 | 46 | 1 | 0 |
|  | 5 | 18 | 50 | 2 | 0 |
|  | 6 | 20 | 51 | 1 | 0 |
|  | 7 | 22 | 55 | 1 | 0 |
|  | 8 | 23 | 56 | 2 | 0 |
| TALL | 9 | 26 | 61 | 2 | 0 |

SIMULATED FIFO ENTRIES AFTER CALL ARRIVAL

FIG. 5

| | PROCEDURE 2: ARRIVAL OFF SITE UPDATE | | | | |
|---|---|---|---|---|---|
| | UPDATE FROM SITE 1: TIME=63 WITH NQ=4 AND OCW=17 --> | | | | |
| | EARLIEST ARRIVAL TIME=67-17=46 SECONDS --> | | | | |
| POSITION | ENTRY | CALL_ID | TIME_ARR | SITE | ANS_BIT |
| DELETED | - | 10 | 30 | 1 | 1 |
| DELETED | - | 14 | 43 | 2 | 1 |
| DELETED | - | 15 | 44 | 1 | 1 |
| HEAD | 1 | 17 | 46 | 1 | 0 |
| | 2 | 18 | 50 | 2 | 0 |
| | 3 | 20 | 51 | 1 | 0 |
| | 4 | 22 | 55 | 1 | 0 |
| | 5 | 23 | 56 | 2 | 0 |
| | 6 | 26 | 61 | 2 | 0 |
| TALL | 7 | 27 | 62 | 1 | 0 |

SIMULATED FIFO ENTRIES AFTER CALL ARRIVAL

FIG. 6

| | PROCEDURE 2: CONT. | | | | |
|---|---|---|---|---|---|
| | RESULTING SIMULATED FIFO LIST DISPLAYS 3 ENTRIES AT SITE 1; | | | | |
| | TOPMS UPDATE SHOW NQ=4-->1 NON-CRP CALL ARRIVAL --> | | | | |
| POSITION | ENTRY | CALL_ID | TIME_ARR | SITE | ANS_BIT |
| DELETED | - | 10 | 30 | 1 | 1 |
| DELETED | - | 14 | 43 | 2 | 1 |
| DELETED | - | 15 | 44 | 1 | 1 |
| HEAD | 1 | 17 | 46 | 1 | 0 |
| | 2 | 18 | 50 | 2 | 0 |
| | 3 | 20 | 51 | 1 | 0 |
| | 4 | 22 | 55 | 1 | 0 |
| | 5 | 23 | 56 | 2 | 0 |
| | 6 | 26 | 61 | 2 | 0 |
| TALL | 7 | 27 | 62 | 1 | 0 |

NEW ENTRY 7

FIG. 7

```
5.0 SECOND UPDATES
  INTERVAL 1
    AGENTS        5      10     20     50     100
    AHT          200    200    200    200    200
    AIT.INT.     42.0   21.0   10.5   4.2    2.1
    UTIL. %      95.2   95.2   95.2   95.2   95.2
    AHT:         200.0
    DTIME:       10.0
    Sm_FACTORS:  0.010  0.010  0.010
    INIT RATES:  0.010  0.030  0.060  0.100  0.300
```

ESTIMATED RATES FOR SITE WITH 5 AGENTS

FIG. 8C

ESTIMATED RATES FOR SITE WITH 10 AGENTS

FIG. 8D

ESTIMATED RATES FOR SITE WITH 20 AGENTS

FIG. 8E

ESTIMATED RATES FOR SITE WITH 50 AGENTS

FIG. 8F

ESTIMATED RATES FOR SITE WITH 100 AGENTS

US 6,263,065 B1

METHOD AND APPARATUS FOR SIMULATING CENTRAL QUEUE FOR DISTRIBUTING CALL IN DISTRIBUTED ARRANGEMENT OF AUTOMATIC CALL DISTRIBUTORS

This application claims priority to U.S. Provisional Patent Application Ser. No. 60/041,077, filed Mar. 18, 1997 of Sanja Durinovic-Johri.

BACKGROUND OF THE INVENTION

1. Technical Field

The present invention relates to dynamically routing calls received into a central controller for a distributed automatic call distributor arrangement and, in particular, to method and apparatus for routing calls in accordance with a process of simulating a central first-in first-out (FIFO) queue, referred to herein as a simulated or virtual queue, whereby an estimate of the actual call removal rate (the rate at which calls are cleared from an actual queue), the estimated delays a caller will have to wait and the like, may be obtained.

2. Description of the Related Arts FIG. 2 of U.S. Pat. No. 5,530,744, entitled Method and System for Dynamic Customized Call Routing, the '744 patent, incorporated herein by reference as to its entire contents, shows a Telemarketing Operations Performance Management System (TOPMS). TOPMS collects event-based data from Automatic Call Distributors (ACDs) and forwards the data to a central Customer Routing Point (CRP). TOPMS may be regarded as a staging area for collecting traffic data from distributed ACDs and home agents and forwarding the collected data to a processor of the Customer Routing Point. The Customer Routing Point makes call routing decisions for 1-800, 1-900 and 1-888 dialed calls among others for the distributed ACD/home agent arrangement so that calls may be handled as efficiently as possible. In accordance with the '744 patent, call load management, or the loading of incoming calls to be handled by servers at distributed Automatic Call Distributor (ACD) locations and home agent sites, occurs as calls are received into the system on a call-by-call basis according to centralized queue control managed by the CRP and in accordance with information received from the TOPMS with calls being queued at the ACDs. These terms, for example, TOPMS and CRP were used in the '744 patent and do not generally describe the dynamic call routing system of the '744 patent; however, the terms as used therein will be used similarly in the present application whenever possible. Again, TOPMS is a call traffic data collection system that collects all data and forms an integrated view of a customer's business application. Further details about TOPMS may be found in U.S. Pat. No. 5,164,983, also incorporated herein by reference.

As used in the present application, a business application is used by way of example as the reason for the call, for example, a sales application, to make an airline reservation, catalog sales and the like. A CRP is the location of a computer processor for processing the collected data and making call routing decisions to servers at the distributed ACD locations and home sites. While shown in the '744 patent as separate systems, the CRP and TOPMS may be at the same location or distributed or one may share or be combined in functionality with the other.

Automatic call distributors (ACDs) are known switches which are capable of receiving incoming telephone calls and routing the calls to agents manning service positions, referred to herein as agent groups. Automatic call distributor switches are manufactured by several manufacturers including Lucent Technologies Inc. Others known in the art include the Definity, the Rockwell Galaxy or Spectrum, Siemens Rolm brand ACDs, Northern Telcom ACD and Aspect brand ACDs. These collect and output traffic related snapshot data indicating, for example, the number of server positions presently manned, the average call handling time, the number of calls in a queue or the number of available agents and the cumulative number of calls offered whereby, according to the '744 patent, parameters may be estimated that assist in call routing decisions. Thus, the '744 patent emphasizes snapshot data and considers historical data.

Figure 1:
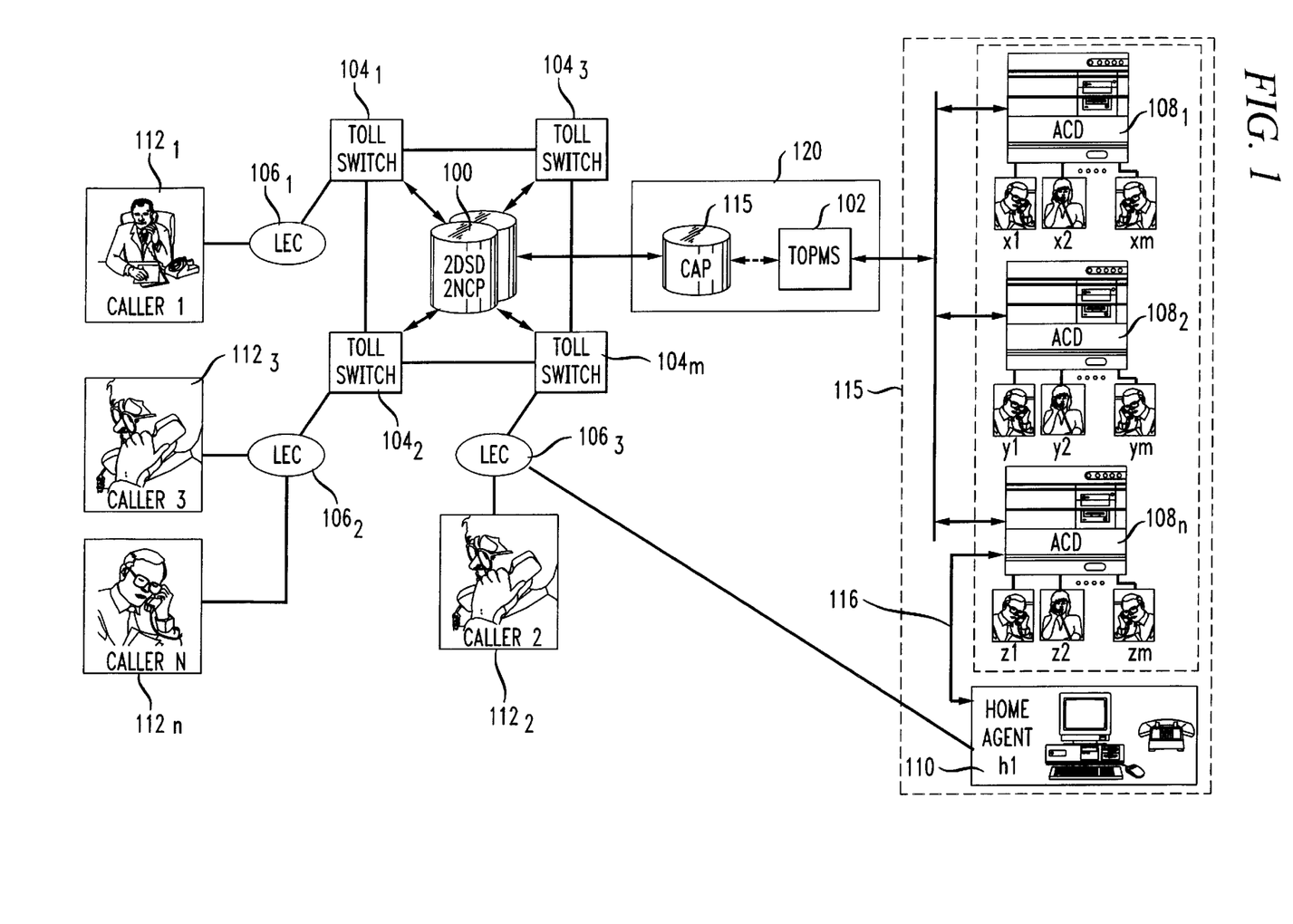
FIG. 1 depicts, in simplified form, an exemplary telephone network comprising distributed ACDs 108 having agents x1, y1 . . . zm of a distributed ACD system 115 including home agents 110 and embodying the principles of the present invention whereby a simulated FIFO approach to dynamic call processing according to the present invention is implemented in an algorithm applied at a processor and memory at a customer routing point (CRP) 125 from data collected via a system (TOPMS) 102 coupled to each of the distributed ACDs 108 or via event-based reporting directly by the ACDs to the CRP, where the home agent status is reported via NCP 100. While shown in the '744 patent as separate systems, the CRP 125 and TOPMS 102 may comprise central controller system 120 and be at the same location or distributed or one may share or be combined in functionality with the other.

In U.S. Pat. No. 5,546,452, there is described a communications system using a central controller to control at least one network and agent system. At column 5, lines 45–60, and with reference to FIG. 2, there is described a process of taking into consideration real-time requested service data as well as historical data in making network control decisions. By way of example and referring to FIG. 1, an airline reservation service may have a number of ACD locations $108_1$, $108_2$, . . . $108_n$ dispersed about a country or even throughout the world, for example, in different time zones. FIG. 1 is derived from FIG. 2 of the '744 patent but has been modified in part for better describing the present invention.

Also, agents may operate out of their homes and are known as home agents 110. Only one home agent is shown. These ACD locations 108 and home agents 110 are shown in FIG. 1 comprising a service system 115. Basically data is collected from these locations 108, 110 and expected delays in call waiting times are balanced among the several sites either based on expected delay times, geographic preferences or customer specified routing options. One approach might be a Minimum Expected Delay Algorithm. Another might be to include consideration of geographic preferences.

As calls enter the system to be handled by servers which may be anywhere in the country, the decision on what location to route the call to is centrally managed via a system 120 comprising TOPMS 102 and a customer routing point (CRP) processor 125. The '744 patent approach to dynamically distributing calls via an algorithm at the customer routing point 125 may be referred to herein as an agent pool based approach.

The agent pool based approach requires four or more parameters from the distributed ACDs 108 and home agents 110 of the service system 115 it serves. Unfortunately, different manufacturers of ACDs may or may not provide all these parameters for call routing decisions. These include and may not be limited to the data described above: 1) the total agent pool size at a given point in time for a particular application (such a pool size may change over time of day as ACD offices close and new offices open) 2) the average call handling time (how long typically does it take an agent to handle a call) 3) the number of calls in queue or the number of available agents, and 4) the cumulative number of calls offered (a cumulative counter of calls offered to a site) which together require several input measures to compose. For example, 1) total agent pool size requires all agents currently available, agents currently talking on inbound calls and agents occupied in post call processing as raw input measures.

The availability or busy status of any ACD agent x1, y1, z1 . . . zm may be reported via the TOPMS. The drawing is simplified to suggest that m agents are on duty at each ACD location, when in fact the number of agents at each site typically differs. Availability and busy status of home agents 110 is reported via the network to system 120. This data reporting is shown, for example, in FIG. 1 by way of link 116 to one of the ACD locations, which typically would be the location nearest the home agents 110. On the other hand, non-local (1-800, 1-900 and 1-888) calls ar Control Point (NCP) 100 for controlling the toll network. The CRP 125 is a typical processor comprising application algorithms including the agent-pool based call routing algorithm and memory for storing call traffic data updates forwarded via TOPMS 102.

Figure 2:
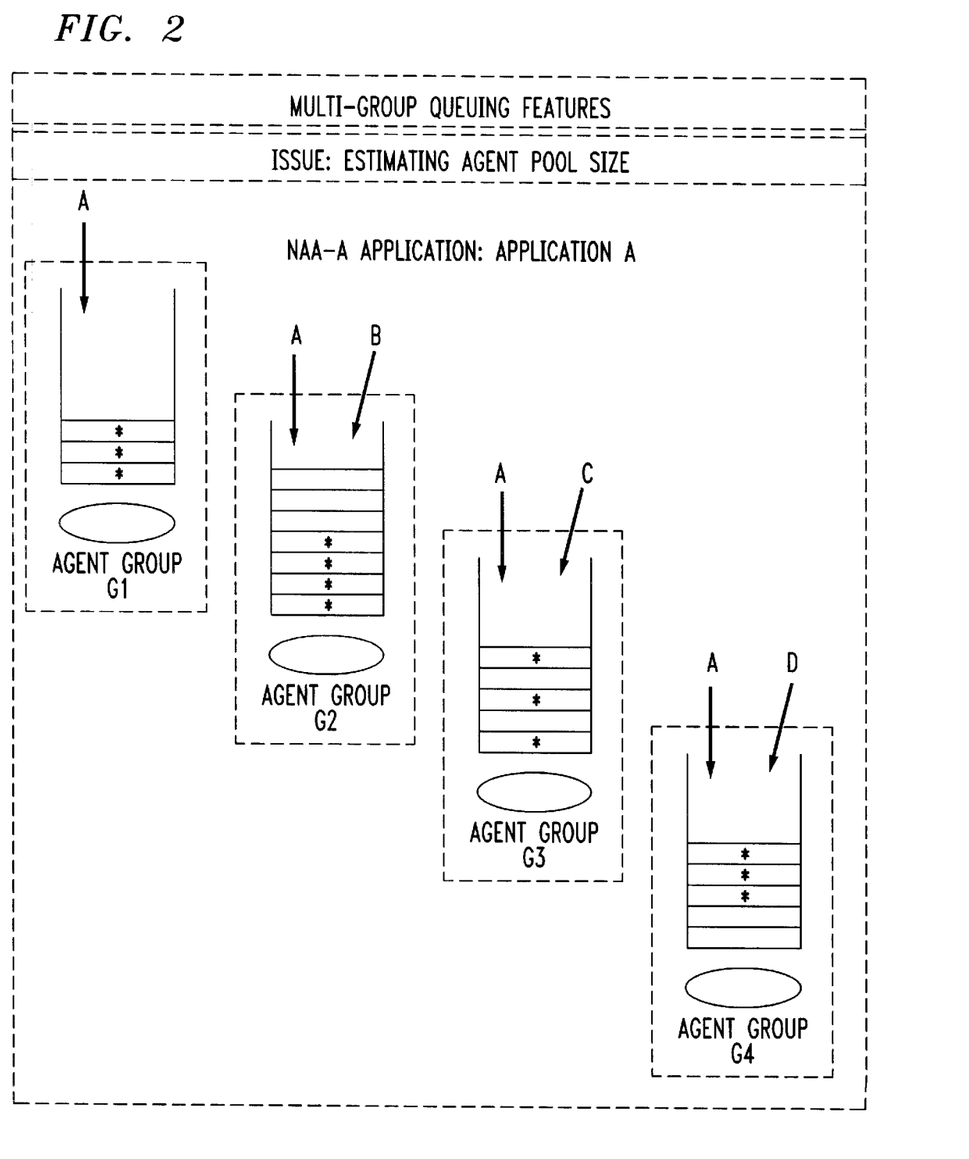
FIG. 2 exemplifies a problem of estimating agent pool size with prior art approaches to dynamic call routing and load balancing a distributed ACD system whereby a call may be placed in multiple queues to be served by different agent groups or, in other words, servers are shared across queues of calls. This is commonly referred to as a multi-group queuing feature of ACDs.

A major issue associated with agent-pool-based algorithms is that the number of ACD agents x1, y1, z1 . . . zm may be inaccurate due to sharing of agents across queues of ACDs and/or applications. This can be seen from FIG. 2. For example, an airline agent may take international reservations A, domestic reservations B, first class/frequent flyer reservations C and further arrange for air freight D. Let us assume that D is a higher priority than A, C has the same priority as A and B has a lower priority than A. Four groups of agents are shown G1–G4 each having a different specialty. G1 handles international reservations (A) while G2, for example, handles international (A) and domestic (B). Calls for international reservations can be queued in any serving line G1–G4 and when handled by one server, the call disappears from all the queues. Sharing of servers across queues complicates the problem that has to be solved by the agent-pool-based algorithm. Thus, the major issue in predicting expected delay with the agent pool based algorithm is in estimating the total agent pool size when calls can be queued among multiple queues and specialty queues as shown in FIG. 2, thus introducing ambiguities.

Consequently, there remains a need in the art for a more simplified method and apparatus for dynamically routing calls in a distributed ACD environment. The agent-pool-based method is subject to the above-described inaccuracies and ambiguities, relies on the collection of too many data elements and relies on the availability of such data from different vendor ACDs. Moreover, a solution should consider both real-time and historical data if available or collectible from the ACDs or home agents.

SUMMARY OF THE INVENTION

The problems and related problems of prior art methods of dynamically routing calls in a distributed queuing environment are solved by the principles of the present invention, a method for simulating a central FIFO queue (a virtual FIFO queue), whereby the system maintains a central queue of all the calls physically queued at the distributed ACD sites and thereby has the capability to track order of service and how close it is to FIFO service. Maintaining this virtual FIFO queue requires two simple measures which almost all ACDs can provide: the number of calls in queue and the oldest call waiting time. Among the advantages of this new method are the following: 1) within the limitation of the information delay and the update interval, the CRP has knowledge of every call in queue, its current waiting time, and the site where it is located, 2) the procedure is self-correcting and errors cannot accumulate, 3) it provides ways of measuring the deviation from strict FIFO order of service, 4) it enables the estimation of the call removal rate from each queue 5) it allows for the use of the delay predictor/corrector method and 6) it allows the capability to requeue or transfer a call based on deviation from true FIFO order of service. This virtual FIFO method, also referred to herein as the simulated FIFO method, predicts the call removal rate (also referred to as the queue advance rate) at each distributed site, the differences in actual and estimated delays and other useful information. Two simple data elements are required which are provided by the different ACDs manufactured by the various manufacturers mentioned above: the number of calls in queue (also used in the agent-pool-based approach) and the oldest call waiting time (how long has the oldest call in the queue been waiting). The simulated FIFO approach of the present invention is easy to establish in an existing system and is more robust to changes in customer operations. Moreover, as will be further described herein, the method and apparatus of the present invention may consider real-time data.

Referring to FIG. 1, the simulated FIFO algorithm is applied at a CRP processor 125. CRP processor 125 in one embodiment of the present invention comprises TOPMS 102. In this embodiment, central controller 120 comprises CRP processor 125 and TOPMS 102. The virtual queue may be maintained in the form of a linked list in memory of CRP processor 125 and may be dependent on pre-bundled update data from a TOPMS system 102 or upon real-time event-based data forwarded directly to the CRP 125 by the distributed ACDs $108_1$, $108_2$, . . . $108_n$. The availability or unavailability or busy status of an agent x1, y1 . . . zm may be reported directly to the TOPMS 102 or to the central controller 120 including TOPMS 102 via the ACDs. Home agent status may be reported via the network control point 100. Call removal rate, the rate at which calls are cleared from the queue, is an important component of the distributed site status predictions and several approaches for estimating call removal rate in a more efficient manner than prior art approaches will be discussed further herein. The three measures required for estimating call removal rate are number of calls in queue, waiting time of the oldest call in queue and number of available (idle) agents. Only the first two measures are required for maintaining the simulated FIFO queue of the present invention. The third measure is required for routing calls when agents are idle and for an efficient estimate of call removal rate.

These and other features of the present invention will become clear from reading the following detailed description of the present invention.

BRIEF DESCRIPTION OF THE DRAWINGS

FIGS. 3–6 describe an example of applying the simulated FIFO approach to a simple system where there are two distributed ACD sites, wherein a first procedure describes what happens when a new call arrives and a second procedure describes when a site update arrives.

FIGS. 7 and 8 relate to a simulation study performed to confirm the applicability the methods described herein versus perfect data reporting.

DETAILED DESCRIPTION

Referring to FIG. 1, there is shown a typical distributed ACD environment in which calls placed by callers, CALLER 1 . . . N, are served at Automatic Call Distributor (ACD) switch locations $108_1$, $108_2$, . . . $108_n$ that may be dispersed all across the country, or the world, probably, in several different time zones. Serving agents x1 . . . xm are located at a first automatic call distributor $108_1$; agents y1 . . . ym at a second ACD $108_2$; and agents z1 . . . zm at a last ACD in the system $108_n$. The use of the term m should not be construed to limit the application of the invention to a situation where each ACD has m agents when typically the number of agents is different at each ACD site. Also, there may exist home agents 110 operating out of their homes such as home agent hi. Link 116 is shown as a typical link whereby data reporting may occur for home agents via their nearest ACD site. Calls as they are received into the system are distributed to the optimum site as a function of site status prediction (queue size and delays based on queue removal rate) and customer preferences. Of course, if there are many servers and few calls, as soon as a call comes in, they may be immediately served. Problems arise when the calls cannot be distributed evenly among agents at different ACDs. Some callers will have to wait longer than other callers at different ACD or home agent sites if one site receives more calls than another site. Callers where the queue is long will complain about long waiting times and that there are not enough agents to serve their needs. According to the present invention, a method of distributing calls to load balance the system 115 is applied at a processor at a customer routing point 125 from site update data collected via a system known as TOPMS 102 or from real-time, event-based data reported directly to the CRP 125 by the ACDs or the home agents, the latter via NCP 100. The 5 approach to dynamic call routing of the present invention is referred to herein as a simulated FIFO approach whereby a virtual queue is established at the CRP 125 which simulates how calls are handled at the distributed sites $108_1$, $108_2$, . . . $108_n$ and 110. It is anticipated that central ACD controller system 120 may collect and utilize real time event-based data in conjunction with historical data as will be further described herein.

A detailed discussion of call processing in the environment of FIG. 1 is found in a discussion of FIG. 2 of U.S. Pat. No. 5,530,744. For example, 1-800, 1-888, and 1-900 calls received at a terminating office of a local exchange carrier 106 from, for example, CALLER 1 are processed by routing signaling information to a network control point 100 and then to a CRP 125 which decides, based on load balancing criteria, the location of a next available agent and returns routing information to route the call to the site $108_1$, $108_2$, . . . $108_n$ or home agent 110, whichever the next available agent may be expected.

In theory, real FIFO (First In First Out) service may be thought to be the most efficient call routing method. It provides the lowest average speed of answer (also referred to as queuing delay, call waiting time, and such) and is believed to have the smallest tail of the waiting time distribution compared with any other routing method. Real FIFO has two very attractive features for those that operate and maintain distributed call distribution environments such as that depicted in FIG. 1: fairness to callers and efficiency in operation. FIFO is fair because calls are answered in FIFO order and each caller in the queue is served in turn. FIFO is efficient since agents cannot be idle while calls are waiting to be answered.

The performance of a system of distributed queues with a central virtual queue as discussed herein can be compared with a real FIFO queue where all agents of system 115 can serve the calls out of one queue. In practice, this arrangement is not used since agents would have to wait for calls to be sent out of the central queue. However, in theory, it serves as a bound on the best possible performance. Also, real FIFO service provides the lowest variance for the delay in queue. It also has the appeal of fairness in serving calls in order of arrival. While the simulated FIFO of the present invention cannot guarantee FIFO order of service, it provides a method of measuring and tracking deviation from FIFO order of service. This is advantageous since it enables a control that moves a call from a queue at one site to an idle server at another site if the deviation from FIFO becomes too large.

The simulated or virtual FIFO approach to call routing in a distributed ACD environment will now be discussed by way of example with reference to FIGS. 3–6.

The Simulated or Virtual FIFO Queue Approach to Call Routing

Figure 3:
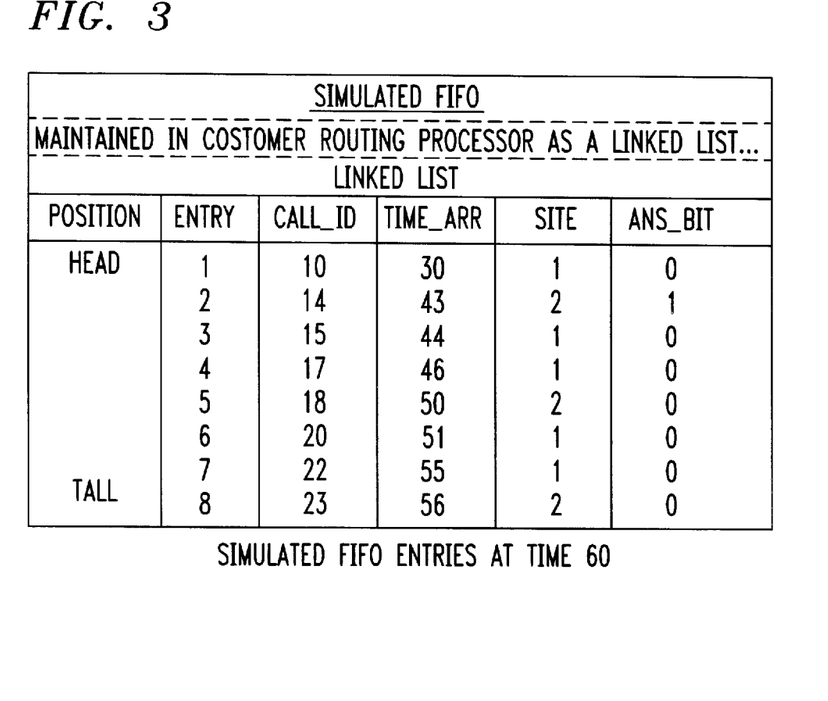
FIG. 3 describes a virtual queue at time T=60 in said first call arrival procedure.

The simulated or virtual FIFO queue is maintained in memory at the processor of customer routing point CRP 125 as a linked list. As described above the processor may be a system processor 120 or distributed at CRP 125 and/or TOPMS 102. An entry for each new call routed by the CRP 125 is added to the tail of this virtual queue. FIG. 3 shows an exemplary virtual queue comprising eight entries in a linked list. Each entry consists of a tabular listing of elements in memory of a processor at system 120. Each entry (for example, entries 1–8 of FIG. 3) in the table may consist of the following items, the last two of which are optional and not shown in FIG. 3:

call_id: a call identifier, typically a sequential number identifying a call,     time_arr: the call arrival time of the call identified by call_id,     site: the site to which the call is routed,     ans_bit: answer bit representing whether the call has been answered or not, initially set to 0, and     req_bit: requeue bit representing whether the call is requeued at another site, initially set to 0,     delay: expected delay as calculated by the method described herein, in the '744 patent or other method known in the art.

The last two variables are not essential for maintaining a virtual FIFO queue according to the present invention. On the other hand, expected delay may be useful for measuring the difference between the actual and estimated delays and using this as a correction factor as will be explained further herein.

The answer bit is changed to 1 when a call is no longer in queue at the serving sites. A call is removed from the queue either because it is answered or because the caller abandoned the call before the call is answered. The requeue bit is set to 1 if the call is requeued from one site to another. An entry is removed from the head of the queue if the answer bit is 1. (In FIGS. 3–6, entry 2 has an ans_bit set to 1 and is eventually deleted from the exemplary linked list). The next entry is also removed from the queue if its answer bit is 1 and the process continues until the head of the virtual FIFO queue is a call with the answer bit 0 or the virtual FIFO is empty (all calls have been served, and there are no calls waiting). This may be seen in FIGS. 5 or 6.

Two update procedures are performed to maintain the virtual queue:

Procedure 1: Each time a call is routed by CRP 125, create an appropriate entry with all the items identified above and add it to the tail of the virtual FIFO queue.

Procedure 2: Each time TOPMS 102 provides a site update to CRP 125, determine which calls have been answered or abandoned, change the answer bits for these calls to 1 and remove all calls with answer bits of 1 from the head of the virtual FIFO queue. The same procedure would follow without TOPMS except more frequently if event-based reporting is permitted directly by ACDs 108 and home agents 310 to CRP 125. See FIGS. 3–4 for an example of Procedure 1.

There are two ways to accomplish Procedure 2. One is by obtaining complete details of the call, for example, via real-time event based data reporting by ACDs. The other way is by obtaining oldest call waiting time. One can use the oldest call waiting time to infer which calls have been answered at a site as follows. See FIGS. 5 and 6 for an example of Procedure 2, using oldest call waiting time.

Suppose that an update from site j arrives at CRP 125 at time T and contains the following information:

$NQ_j$: represent the number of calls in the virtual queue with site identifier j;

$ocw_j$: be the waiting time of the oldest call in queue at site j; and $AAV_j$: be the number of available (idle) agents at site j.

Only the first two variables are needed for maintaining the simulated FIFO queue. If no calls are in queue, then both of them have the value 0. The oldest call waiting at the site queue arrived at time $T-ocw_j$. Hence, all calls, if any, in the virtual FIFO with site=j and with time_arr less than $T-ocw_j$ are no longer in queue. The third variable, $AAV_p$ is required for routing calls when agents are idle.

Referring to FIG. 3, the entries of the linked list table of processor memory of CRP 125 comprise the parameters defined above and the present tail of the linked list is entry 8 at time T=56 seconds. The depicted example represent data for just two ACD sites, site 1 and site 2. Entries 2, 5 and 8 are for calls sent to site 2 and the remaining entries are for calls sent to site 1 by CRP 125. Note that the answer bit for entry 2 at site 2 has been set to 1. This call has been answered. This entry, however, has not been deleted from the virtual FIFO as it is not at the head of the virtual FIFO linked list.

Figure 4:
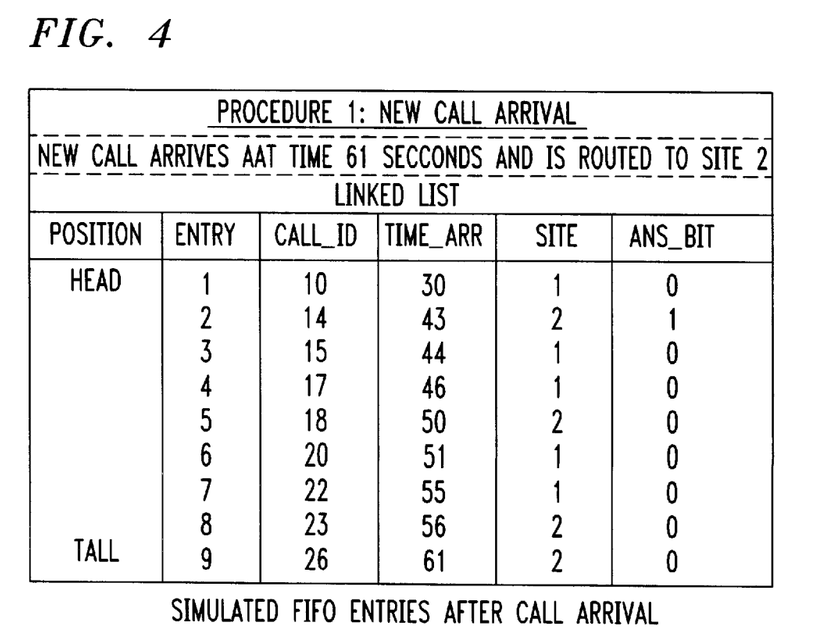
FIG. 4 shows the same virtual FIFO queue after a new call arrives at T=61.
Figure 5:
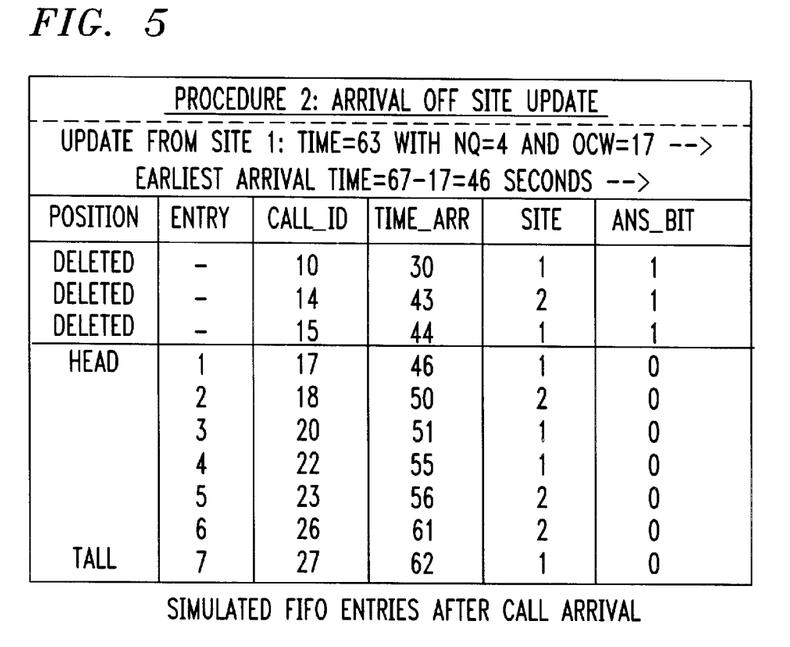
FIG. 5 shows a virtual FIFO upon arrival of a site update according to said second site update procedure.
Figure 6:
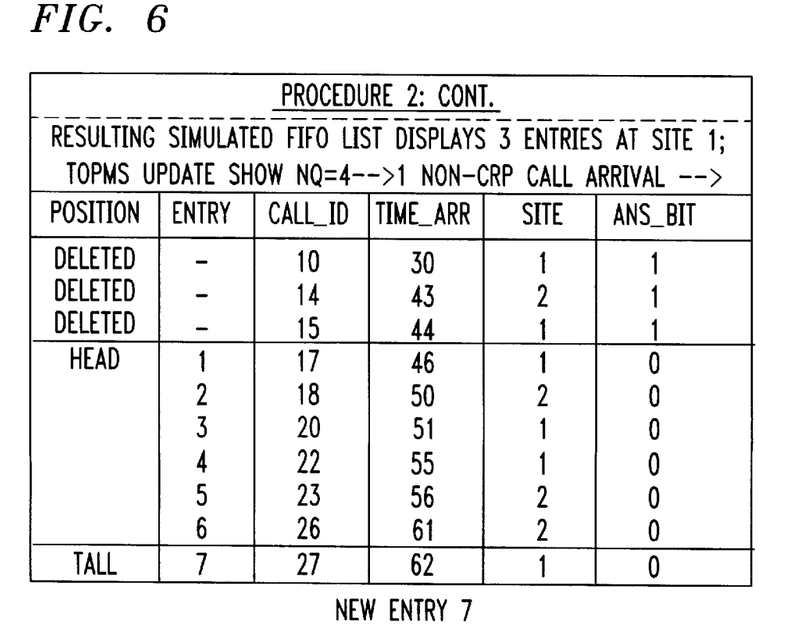
FIG. 6 shows a call arrival after a site update.

FIG. 4 shows the addition of a new tail where a new call arrives at T=61 seconds'as entry 9. Entry 2 is still not the head of the linked list and so has not been deleted. FIGS. 5–6 will be discussed subsequently herein.

Not all calls must be routed via the CRP 125. Typically, referring to FIG. 1, callers may connect to their local serving ACD 108 by dialing a number through their local exchange carrier 106. None of these calls are routed through the CRP 125 (which typically handles toll-free calls from more distant locations). A fixed fraction of calls may be routed directly to the primary site via NCP 100 without going through the CRP 125. All non-CRP calls are routed without the knowledge of the CRP 125. The CRP 125 has no knowledge of the number and arrival times of non-CRP calls.

The site updates include the total number of calls queued at the site, and the CRP 125 has no way of knowing how many of the total number of calls are non-CRP calls and how many were routed by the CRP. Non-CRP calls can be accounted for in the virtual FIFO queue procedure in the following way:

After a site update has been processed as described above, let $nq_j$: number of calls in the virtual FIFO with site=j and ans_bit=0.

Then, if $nq_j<Nq_j$, that is, there are fewer calls in the virtual queue than at the site, then the difference is assumed to be due to non-CRP call arrivals at the site. Hence, $Nq_j-nq_j$, non-CRP calls must have arrived at the site j in the last update interval. So these calls can be inserted into the virtual FIFO queue with an expected arrival time T−0.5 γ if the previous site update was at time T−γ. If there is more than one non-CRP call, their arrival times may be equally spaced between T−γ and T. The actual arrival time need not coincide with the expected arrival time and so the arrival time can be in error. The size of the error is bounded by the update interval. With frequent updates, for example, every half to every five seconds directly from the ACD locations, the error is negligible.

Calls also can be abandoned (the caller gives up and hangs up) while in queue at site. This can further complicate the picture. The condition where the number of calls in the virtual queue exceeds the number of actual calls in queue at the sites indicates that calls have become abandoned. Since it is not known at the CRP 125 which calls have become abandoned, nothing can be done immediately at a CRP 125. However, calls which are abandoned will ultimately show up as answered and be removed from the virtual FIFO. Thus, abandoned calls do not create a problem by themselves, but can be effect the count of non-CRP calls. For example, a call can abandoned while another non-CRP call may arrive. The count of calls in queue will not change at the CRP 125 and the virtual queue procedure will not detect that this has happened. The procedure, however, maintains the correct number of calls in queue with a non-CRP arrival maintained as a call that did not abandon. The net effect is a different arrival time time_arr for this call. One way of minimizing this error is to access information on abandoned calls from the ACD 108 which is available from most if not all ACDs.

The discussion of the FIFO process will be continued with reference to FIG. 5. At Time T=63, a data update arrives to say that the number of calls in queue at site 1 is 4; also, the oldest call waiting has been waiting 17 seconds. The oldest call waiting could not have arrived before the earliest arrival time and so that the earliest arrival time=63−17 seconds or 46 seconds. So 46 seconds is the presumed latest time_arr. Calls with an earlier time_arr have their ans_bit changed to one, if not already one, and deleted from the list if they are at the head of the virtual FIFO queue. Call 10 and call 15 must have been answered. Since entry 2 becomes the head of the linked list after entry 1 is deleted, it may now be deleted.

Now the number of entries with answer bit 0 and site identifier 1 equals 3 and since the number of calls in the virtual queue minus the calls in queue at site 1 is 1 (4−3), a non-CRP call must have arrived during the last update interval from site 1 and an entry must be created in the virtual queue. Assuming the length of the update interval, L=2 seconds, the new entry's arrival time is set to 63−1=62 seconds. Thus, the head of the linked list in the virtual queue becomes call_id 17 and the tail was call_id 26 until the non-CRP call is added as entry 7. This result is shown in FIG. 6.

In FIG. 6, if a new call 28 arrives at time T=63 for, for example, distribution to site 2, it would be added to the tail of the linked list as a new entry 8 (not shown) and so the process continues. From this example, the reader may come to an appreciation of how the simulated FIFO approach may be applied to distributing and accounting for calls at a CRP 125.

It takes some time for calls to reach the sites after the CRP 125 commands that they be routed to the site, for example, signaling and switching delays in addition to call waiting in queue delays. It also takes some time to collect information via TOPMS and to send updates from the sites to the CRP either with or without the buffering provided by TOPMS. The sum of these two delays may be quite small and be bounded between minimum dmin and maximum dmax values in seconds. Now, the update which arrives at the CRP 125 at time Tcontains site information collected no earlier than time T−dmax for T in the previously described procedures. The only exception is the adding of non-CRP calls described above. In calculating the earliest arrival time, we may substitute T−dmin for T as we want to be sure that a non-CRP call did arrive.

Also, the virtual FIFO procedure is a self-correcting procedure in that both non-CRP calls which may have been added in error and abandoned calls will be removed from the virtual FIFO queue as soon as the earliest arrival time becomes larger than their arrival time. Thus, errors are transient and do not accumulate.

If there are calls in the middle of the virtual FIFO with an answer bit value of one, then the FIFO principle is being violated (that is, if an unanswered call remains in a linked list ahead of an answered call). For example, call number 14 (entry 2) in FIG. 3 has been answered before call 10 (entry 1) in violation of the FIFO principle. Call 14 arrived 13 seconds later than call 10.

The differences in arrival times or relative queue positions can both be used as measures of the amount of deviation from true FIFO service. A large difference may signal the need for corrective action such as requiring of calls at another site.

Using a formula for estimating expected delay or other methods known in the art, the expected delay on arrival for each call can be stored in the virtual FIFO. The current expected delay equals the time already spent in queue (=T−time_arr) plus the remaining expected delay. The latter can be obtained from the current position in the virtual FIFO and the expected delay formula. A current expected delay significantly larger than the expected delay upon arrival can also signal the need for possible corrective action.

One can also estimate the call removal rate from the virtual FIFO queue. The call removal rate is the rate at which calls are being cleared from the queue, that is, the calls that are answered at the sites or abandoned. The number of calls answered in each update interval is directly available from the virtual FIFO queue. Divided by the duration of the last update interval (L), it gives the estimated call removal rate over that last update interval. Estimating call removal rates over short time intervals can be error prone. If the number of calls answered is small, then the standard deviation of the estimated rate can be quite high. Thus, the call removal rate should be taken over several update intervals or smoothed over time.

Expert agents are agents that have expertise that are not necessarily shared by other agents. For example, from FIG. 2, there are agents that may have expertise in air cargo while all agents can handle domestic reservations. Agents with multiple skills or having sites with multi-group queuing per FIG. 2 is a specialized issue in call routing algorithms. Such features have the potential of creating situations where the actual delay is consistently higher or lower than the delay estimated by a delay estimation procedure known in the art. An example of such a situation is when agents from another application back up the application under a next available agent control which may lead to an under count or over count of the agents staffing the application. With multi-group queuing features, it is difficult to make the agent count more accurate. On the other hand, if the difference between actual and estimated delays is measured and used as a correction factor, then, agent count can be made more accurate. This option may be referred to as the delay predictor/corrector method. The virtual FIFO provides both the estimated and actual delays for each call routed by the CRP 125. Hence, the virtual FIFO provides the information necessary to calculate the correction factor and change the delay estimate. Routing logic and call removal rate estimation will now be discussed in some detail.

Routing Logic and Call Removal Rate (CRR) Estimation

At each call arrival to the CRP 125, the routing decision is made based on site status evaluation (that is, the queue length and delays) of all sites and customer specified routing preferences. The site status is predicted based on instantaneous information of the number of calls in queue or total number of agents available (idle), as follows:

$$EWT_j = \frac{(NQ_j - AAV_j + 1)}{CRR_j}. \tag{1}$$

Here, CRR denotes the call removal rate for site j When all agents are busy at a site, the expression (1) represents the expected wait time of a new call, i.e., $EWT_j=E[\text{Wait\_time}|\text{Queue\_size}=NQ_j]$. For a site with at least one idle agent, the EWT expression (1) would be negative and would indirectly balance the site occupancies.

Once a call is routed to a site k, the site's predicted number of calls in queue, $NQ_k$ is incremented by 1 and stored with an appropriate time stamp.

The '744 Patent Method For Estimating Call Removal Rate

The '744 patent method assumes exponential service times and estimates $CRR_j$ as a ratio of the number of agents (#Agents$_j$) and average call handling time ($AHT_j$). Numerous simulation studies based on customer data have evaluated the performance of this method. The results, as well as real experience with big customers, demonstrate that the routing algorithm can achieve performance benefits equal or close to a single pool of agents, which is used as a benchmark for the best possible outcome. This method is based on at least seven site status inputs which are periodically preprocessed into required input parameters for the ARS routing logic.

Another Approach to Estimation Of Call Removal Rate

Now, we explore the approach for estimating call removal rate of the present invention by using the information provided by a virtual FIFO queue on the number of calls answered during the update interval. This novel approach assumes periodic updates of only three site specific measures: number of calls in queue, oldest call waiting time and total number of available agents. We need to estimate the maximum call answer rate, i.e., the answer rate when all agents are busy. A problem arises, however, with periodic site status updates for those intervals when not all agents are busy. We need to determine which updates are valid to use. For each "chosen" interval, we calculate the answer rate and use exponential smoothing to estimate call removal rate.

We explore alternate approaches for estimating call removal rate CRR based on three Queue Advance Rate methods and one Call Completion Rate method.

Queue Advance Rate Methods, which are employed by some ACDs, calculate a new CRR as a rate at which queue advances when all agents are busy. These methods differ in their approach to inferring which intervals satisfy the "busy agents" condition:

Queue Advance Rate 1 No idle agents in current and previous site status update;

Queue Advance Rate 2 No idle agents in previous site status update only;

Queue Advance Rate 3 Positive queue size in previous site status update & queue size that exceeds the number of calls answered.

For each method, whenever an update interval satisfies the method+s condition, we calculate the answer rate for this interval and use exponential smoothing to estimate call removal rate. All other update intervals are ignored.

Call Completion Rate Method uses all update intervals. It calculates first the call completion rate, $ccr_j$, based on calls completed (exponential smoothing is used). $CRR_j$. estimate is then obtained by inflating the $ccr_j$ with a correction factor based on average number of idle agents.

The Average Number Of Agents Available, $AAV_j^{avg}$, is estimated at each site status update for site $j$. Simple exponential smoothing with smoothing factor SF1 is used to obtain the new estimate:

$$AAV_j^{avg} = SF1 \cdot AAV_j + (1.0 - SF1) AAV_j^{avg}, \quad 0.0 < SF1 < 1.0. \quad (2)$$

The next two steps are performed only if the time since the last calculation of the call removal rate exceeds pre-specified time interval of DTIME seconds.

For a site $j$, we define $ANS_j$ cumulative counter of calls answered. This counter, initially set to zero, is reset after every calculation of call removal rate;

$\Delta t_j^{calc}$ time since the last calculation of the call removal rate;

DTIME minimum time between calculations of call removal rate.

At each update for the site $j$, if $\Delta t_j^{calc} <$ DTIME, the method ignores this new update (and its time stamp) and continued with the prediction from the last site status update. Otherwise, it predicts the new $CRR_j$ in the following way.

1. It estimates the number of calls completed, $NCC_j$, based on number of calls answered and the current and last update of the number of agents available:

$$NCC_j = ANS_j - AAV_j^{last} + AAV_j^{curr} \quad (3)$$

It calculates the call completion rate by expression (4) below:

$$ccr_j = \text{Max}\left\{ SF2 \frac{NCC_j}{\Delta t_j^{calc}} + (1 - SF2)ccr_j, \ 0.005 \right\}, \quad (4)$$

$$0.0 < SF2 \leq 1.0.$$

2. A new estimate for the Call Removal Rate, $CRR_j$, is obtained by $CRR_j = IF_j ccr_j$, where the inflating factor $IF_j$ is given by $$IF_j = \frac{ccr_j AHT_j + AAV_j^{avg}}{ccr_j AHT_j}. \quad (5)$$

In equation (5), $AHT_j$ is a static value based on customer historical data. This value, together with the effective number of agents, is also used to initialize the smoothing procedure given by equation (4).

Call removal rate obtained by this method represents an estimate for the mean maximum potential service rate, i.e., service rate when all agents are busy. It is approximated by the ratio of call answer rate ccrj and site utilization $\rho_j$, which is the reciprocal value of $IF_j$. This is a method of estimating call removal rate by estimating agents busy.

One simplification of this method can be obtained by calculating call completion rate based on the number of calls answered. This approach modifies only the step 1. of the above procedure by substituting $NCC_j$ in equation (4) with $ANS_j$. For the smoothing factors that optimize performance, we found out that there is hardly any difference between the call completion rate method and its simplification.

Performance Comparison

Figure 7:
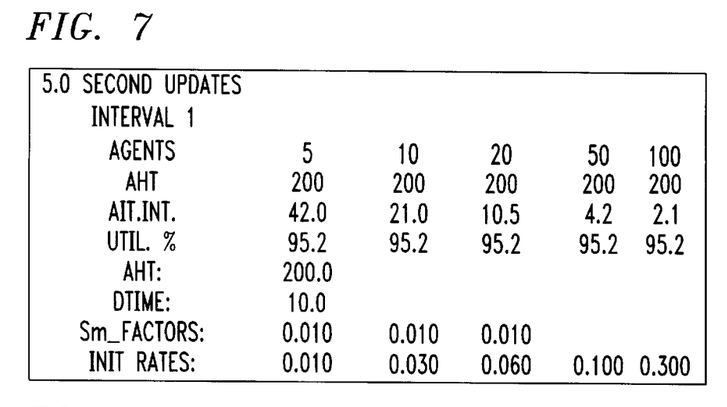
FIG. 7 describes the parameters used for each of five ACDs and update interval.
Figure 8A:
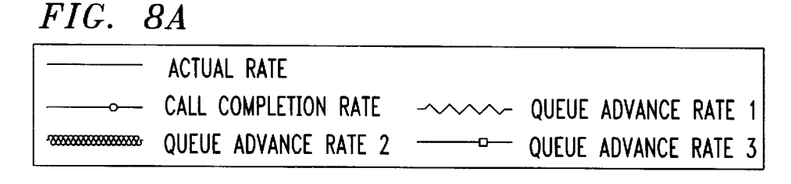
FIG. 8A is a key figure for describing the graphical data of FIGS. 8B–8F.
Figure 8B:
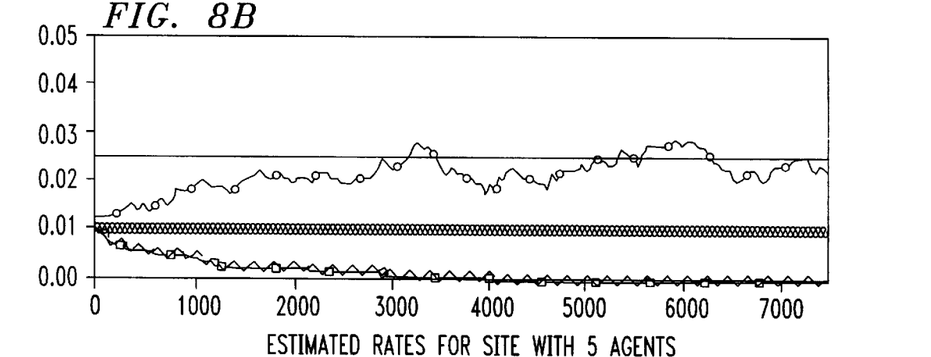
FIGS. 8B–8F show the modeling results for ACDs of varying sizes.
Figure 8C:
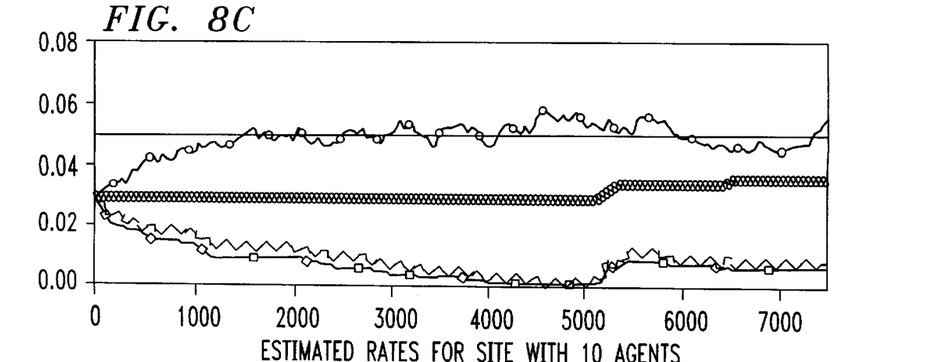
Figure 8D:
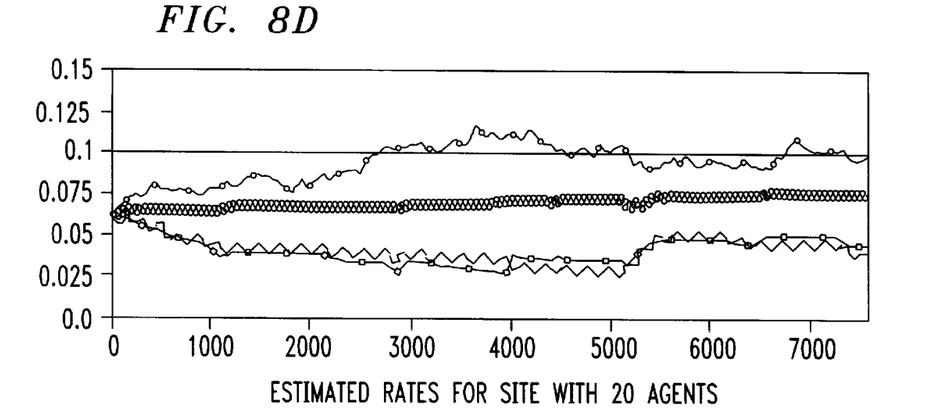
Figure 8E:
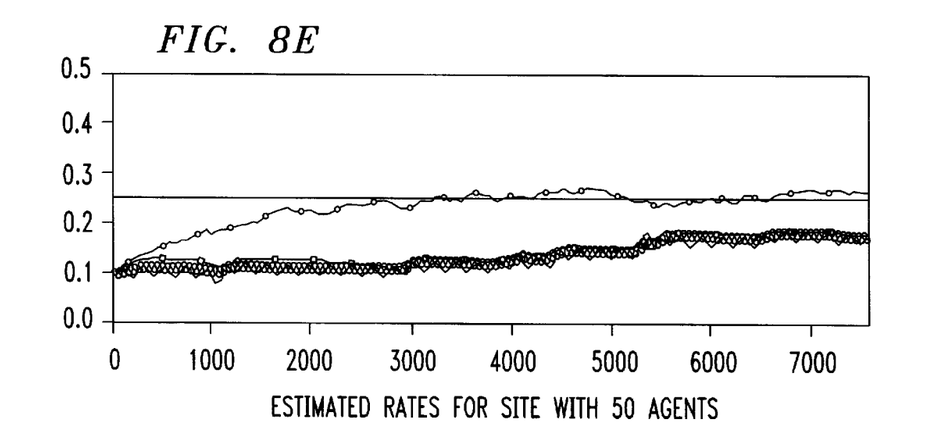
Figure 8F:
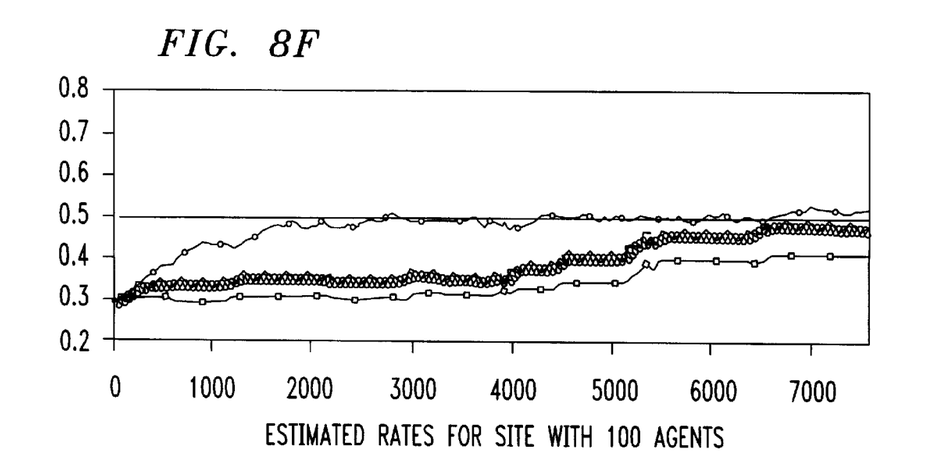

FIGS. 7 and 8 relate to a simulation study performed to confirm the applicability the methods described herein versus perfect data reporting. FIG. 7 describes the parameters used for each of five ACDs and update interval. FIG. 8A is a key figure for describing the graphical data of FIGS. 8B–8F. FIGS. 8B–8F show the modeling results for ACDs of varying sizes. Efficiency of these methods was evaluated by simulation study. We modeled five sites of various sizes (FIGS. 8B–8F) with exponential service times and Poisson arrivals to the CRP 125. Calls are routed based on perfect information of number of agents and average handling time. In parallel, call removal rate is calculated based on alternate methods and compared against call removal rate based on perfect information. We varied the site utilization, update frequency, time between smoothing calculations, smoothing factors values, initial values for call removal rates, etc.

FIGS. 8B–8F illustrate the CRR estimates based on the above methods against the actual rate based on perfect information on number of agents and average call handling time for sites of various sizes and site utilization of 95%.

The results show that the call completion rate method tracks "perfect" call removal rate much better than any of the queue advance rate methods. Similar results were obtained for other scenarios and parameters. Dynamic call distribution based on this method should perform reasonably well, while at the same time, it should eliminate the need for complicated (and, yet, inaccurate) data collection.

Thus there has been described a simulated FIFO queue algorithm for determining load balancing in a distributed ACD environment. Other features and practices may become apparent to one of ordinary skill from the above discussion. Any United States patents referenced herein should be deemed to be incorporated by reference as to their entire contents for an appreciation of the present invention. The present invention should only be deemed to be limited in scope by the claims which follow.

What we claim is:

1. A method for load balancing calls in a distributed automatic call distributor system having a plurality of automatic call distributors, the method comprising steps of:

creating a virtual queue at a routing point in the distributed automatic call distributor system, the virtual queue including a list of individual records, each record containing information relating a call waiting in a queue that is associated with an automatic call distributor of the plurality of automatic call distributors; and simulating how each call corresponding to a record in the virtual queue is handled in the queue in which the call is waiting based on an update message received from the automatic call distributor associated with the queue in which the call is waiting, the update message containing information relating to a number of calls in the queue associated with the automatic call distributor and information relating to a longest call waiting time in the queue associated with the automatic call distributor.

2. A method as recited in claim 1, wherein the update message further includes information relating to an arrival time for a call waiting in the queue associated with the automatic call distributor, the method further comprising a step of estimating an expected call waiting delay for each call having a record in the virtual queue based on a number of calls having a record in the virtual queue and the longest call waiting time.

3. A method as recited in claim 2, further comprising a step of periodically receiving the update message from an automatic call distributor.

4. A method as recited in claim 3, wherein the periodically-received update message contains information relating to a number of available agents at the automatic call distributor.

5. A method as recited in claim 2, further comprising a step of estimating a call removal rate for each automatic call distributor based on a call completion rate.

6. A method as recited in claim 5, wherein the call completion rate is based on a number of calls having a record in the virtual queue that are answered.

7. A method as recited in claim 5, wherein the update message includes information relating to a number of available agents at the automatic call distributor, and wherein the call completion rate is based on the number of available agents at the automatic call distributor and on a number of calls in the virtual queue that are answered.

8. A method as recited in claim 5, wherein the step of estimating the call removal rate includes a step of determining the call completion rate based on an average number of available agents.

9. A method as recited in claim 8, wherein the step of determining the call completion rate is further based on an inflating factor, the inflating factor being based upon call the call completion rate, the average number of available agents and an average call handling time.

10. A method as recited in claim 9, further comprising a step of determining an expected wait time for a call based on a number of calls in the queues associated with each of the automatic call distributors of the plurality of call distributors and the estimated call removal rate.

11. A method as recited in claim 9, further comprising a step of determining a routing decision for a call having a record in the virtual queue when at least one agent is available to take a call, the routing decision being further based on a number of available agents and the estimated call removal rate.

12. A method as recited in claim 1, wherein the step of creating the virtual queue includes steps of:

creating a record in the virtual queue containing information relating to each new call waiting in a queue associated with an automatic call distributor of the plurality of automatic call distributors; and adding the record to a tail of the virtual queue.

13. A method as recited in claim 12, further comprising a step of periodically receiving the update message from each automatic call distributor, each update message further including information relating to an arrival time for each new call.

14. A method as recited in claim 13, further comprising a step of determining which records in the virtual queue are for calls that are not routed through the routing point.

15. A method as recited in claim 13, further comprising a step of determining a deviation from a first-in, first-out order of service for a call having a record in the virtual queue.

16. A method as recited in claim 15, further comprising a step of requeuing the call at another automatic call distributor based on the determined deviation from the first-in, first-out order of service for the call.

17. A method as recited in claim 1, further comprising a step of routing a call having a record in the virtual queue based on an expected wait time for the call.

18. A method as recited in claim 17, further comprising steps of:

measuring an actual wait time for a call having a record in the virtual queue based on the virtual queue;

determining a difference between the measured wait time for the call and an estimated expected wait time for the call; and correcting an expected wait time estimate based on the calculated difference between the measured wait time for the call and an estimated expected wait time for the call.

19. A method as recited in claim 1, wherein the update message further including event-based information for the call.

20. A method as recited in claim 19, further comprising a step of updating of the virtual queue based on each received update message.

21. A method as recited in claim 20, further comprising a step of estimating a call removal rate for each respective automatic call distributor based on a call completion rate for each automatic call distributor.

22. A method as recited in claim 21, wherein the call completion rate at an automatic call distributor is based on a calculated number of calls answered at the automatic call distributor.

23. A method as recited in claim 21, wherein the event-based information includes information relating to a number of available agents, the method further comprising a step of periodically determining the call completion rate based on the available agents and on the number of calls answered having a record in the virtual queue.

24. A method as recited in claim 21, wherein the event-based data includes information relating to available agents, and wherein the step of estimating the call removal rate includes a step of inflating the call completion rate based on an average number of available agents.

25. A method as recited in claim 24, wherein the step of inflating the call completion rate is based on an inflating factor, the inflating factor being based upon the call completion rate, the average number of available agents and an average call handling time.

26. A method as recited in claim 20, further comprising a step of determining calls having records in the virtual queue that were not routed through the routing point.

27. A routing point in a distributed automatic call distributor system having a plurality of automatic call distributors, the routing point comprising:

a memory storing a virtual queue, the virtual queue being arranged as a first-in, first-out queue and including a list of individual records, each record containing information relating a call waiting in a queue associated with an automatic call distributor of the plurality of automatic call distributors; and a processor routing calls having records in the virtual queue, the processor receiving an update message from each automatic call distributor, each update message containing information relating to a number of calls in the queue associated with the automatic call distributor and information relating to a longest call waiting time in the queue associated with the automatic call distributor, the processor routing calls based on the number of calls in queues associated with each respective automatic call distributor of the plurality of automatic call distributors, the longest call waiting time and a total number of available agents for each automatic call distributor of the plurality of automatic call distributors.

28. The routing point as recited in claim 27, wherein the update
messages further include information relating to calls in a queues associated with an automatic call distributor of the plurality of automatic call distributors.

29. A routing point in a distributed automatic call distributor system having a plurality of automatic call distributors, the routing point comprising:

a memory storing a virtual queue, the virtual queue being arranged as a first-in, first-out queue and including a list of individual records, each record containing information relating a call waiting in a queue associated with an automatic call distributor of the plurality of automatic call distributors; and a processor routing calls according to the virtual queue, the routing point receiving an update message from an automatic call distributor containing update event-based information relating to a number of calls in queue associated with the automatic call distributor and information relating to a longest call waiting time in the queue associated with the automatic call distributor.

30. The routing point according to claim 29, wherein the update message further includes information relating to a number of calls in the queue associated with the automatic call distributor and information relating to a longest call waiting time in the queue associated with the automatic call distributor.

31. A method for simulating a queue at a routing point in a distributed automatic call distributor system having a plurality of automatic call distributors, the method comprising steps of:

receiving at the routing point from each automatic call distributor information relating to a longest call waiting time for calls in each queue associated with an automatic call distributor, and creating a virtual queue at the routing point, the queue containing information representing calls the plurality of queues at each of the distributed automatic call distributors.

32. A method as recited in claim 31, further comprising steps of:

receiving at the routing point information relating to a number of calls in each queue associated with an automatic call distributor and a total number of available agents associated with the automatic call distributor;

determining a call completion rate; and estimating a call removal rate at each automatic call distributor based on the determined call completion rate.

33. A method as recited in claim 32, wherein the step of determining the call completion rate includes a step of determining a number of calls answered having a record in the virtual queue.

34. A method as recited in claim 32, wherein the step of determining the call completion rate includes a step of determining a number of calls completed based on information relating to available agents and based on a number of calls answered having a record in the virtual queue.

35. A method as recited in claim 32, wherein the step of estimating the call removal rate includes a step of inflating the call completion rate based on an average number of available agents.

36. A method as recited in claim 35, wherein the step of inflating the call completion rate is based on an inflating factor, the inflating factor being related to the call completion rate, the average number of available agents and an average call handling time.

37. A method as recited in claim 31, wherein the step of receiving information relating to the number of calls in each queue associated with an automatic call distributor and the longest call waiting time for calls in each queue associated with an automatic call distributor includes a step of receiving periodic update messages from each automatic call distributor.

38. A method as recited in claim 31, wherein the step of creating the virtual queue at the routing point includes steps of:

creating an entry for the virtual queue for each new call that is in a queue associated with an automatic call distributor; and adding the entry to a tail of the virtual queue.

39. A method as recited in claim 31, wherein the step of receiving information relating to the number of calls in each queue associated with an automatic call distributor and the longest call waiting time for calls in each queue associated with an automatic call distributor includes a step of receiving periodic update messages from each automatic call distributor.

40. A method as recited in claim 39, further comprising a step of determining which calls having a record in the virtual queue have been answered.

41. A method as recited in claim 40, further comprising a step of determining a deviation from first in, first out order of service for a call having a record in the virtual queue.

42. A method as recited in claim 31, further comprising steps of:

determining a deviation from a first-in, first-out order of service for a call having a record in the virtual queue; and requeuing the call at another automatic call distributor.

43. A method as recited in claim 31, further comprising steps of:

measuring an actual wait time for a call having a record in the virtual queue based on the virtual queue;

determining a difference between the measured wait time for the call and an estimated expected wait time for the call; and correcting the estimated expected wait time for the call based on the determined difference between the measured wait time for the call and the estimated expected wait time for the call.

44. A method as recited in claim 31, further comprising a step of forming a list of entries for each call that is to be routed at the routing point.

45. A method for simulating a queue at a routing point in a distributed automatic call distributor system having a plurality of automatic call distributors, the method comprising steps of:

receiving update event-based data contained on an update message for calls to the automatic call distributor system, the update event-based data including information relating to a number of calls and a longest waiting time for calls in each queue associated with an automatic call distributor; and creating a virtual queue at the routing point, the virtual queue including a list of individual records, each record containing information relating a call waiting in a queue associated with an automatic call distributor of the plurality of automatic call distributor system.

46. A method as recited in claim 45, wherein the step of receiving event-based data includes a step updating records in the virtual queue waiting in a queue associated with each automatic call distributor.

47. A method as recited in claim 45, further comprising a step of determining calls in the virtual queue that are not routed through a routing point.

48. A method as recited in claim 45, wherein the virtual queue is updated with data for each call that is answered.

49. A method as recited in claim 45, further comprising steps of:

receiving event-based data from an automatic call distributor, the event-based data relating to a count of a total number of available agents associated with the automatic call distributor; and estimating a call removal rate at the automatic call distributor based on a call completion rate.

50. A method as recited in claim 49, wherein the call completion rate is based on a determined number of answered calls having a record in the virtual queue.

51. A method as recited in claim 49, wherein the call completion rate is based on a number of calls completed to available agents and on a number of answered calls having a record in the virtual queue.

52. A method as recited in claim 49, wherein the step of estimating the call removal rate includes a step of inflating the call completion rate based on an average number of available agents.

53. A method as recited in claim 52, wherein the step of inflating the call completion rate is based on an inflating factor, the inflating factor being based on the call completion rate, an average number of available agents and an average call handling time.

54. A method as recited in claim 52, wherein the step of creating the virtual queue includes steps of:

receiving periodic data update from an automatic call distributor, the periodic data update containing information relating to a new call received at the automatic call distributor;

creating a new entry for the virtual queue for each new call that is received at the automatic call distributor based on the periodic data update; and adding each new entry to a tail of the virtual queue.

55. A routing point in a distributed automatic call distributor system having a plurality of automatic call distributors, the routing point comprising:

a processor forming a virtual first-in, first-out queue, the virtual queue including a list of individual records, each record containing information relating a call waiting in a queue associated with an automatic call distributor of the plurality of automatic call distributors, the processor receiving an update message containing information relating to a number of calls and a longest call waiting time for each automatic call distributor; and memory storing the records as the virtual queue.

56. The routing point as recited in claim 55, wherein the routing point receives periodic update messages from a data collection system.

57. A routing point in a distributed automatic call distributor system having a plurality of automatic call distributors, the routing point comprising:

a processor forming a virtual first-in, first-out queue, the virtual queue including a list of individual records, each record containing information relating a call waiting in a queue associated with an automatic call distributor of the plurality of automatic call distributors, the routing point receiving update event-based data for calls waiting in queues associated with the automatic call distributors, the update event-based data including information relating to a number of calls and a longest call waiting time for calls in each queue associated with an automatic call distributor of the plurality of automatic call distributors; and a memory storing the records as the virtual queue.

* * * * *